No. 742,964. PATENTED NOV. 3, 1903.
F. A. BROWNELL.
SPOOL.
APPLICATION FILED JULY 2, 1900.
NO MODEL.

Witnesses
G. Willard Rich.
G. A. Roda.

Inventor
Frank A. Brownell
by Frederick F. Church
his Attorney

No. 742,964. Patented November 3, 1903.

UNITED STATES PATENT OFFICE.

FRANK A. BROWNELL, OF ROCHESTER, NEW YORK, ASSIGNOR TO THE EASTMAN KODAK COMPANY, OF ROCHESTER, NEW YORK, A CORPORATION OF NEW YORK.

SPOOL.

SPECIFICATION forming part of Letters Patent No. 742,964, dated November 3, 1903.

Application filed July 2, 1900. Serial No. 22,272. (No model.)

*To all whom it may concern:*

Be it known that I, FRANK A. BROWNELL, of Rochester, in the county of Monroe and State of New York, have invented certain new and useful Improvements in Spools; and I do hereby declare the following to be a full, clear, and exact description of the same, reference being had to the accompanying drawings, forming a part of this specification, and to the reference-numerals marked thereon.

My present invention has for its objects to provide a cheap and serviceable spool adapted particularly for use in making film-cartridges to be used in photographic cameras and which can readily be manufactured from inexpensive material by automatic machinery; and to this end the spool consists in the improved construction hereinafter fully described and claimed.

Figure 1:
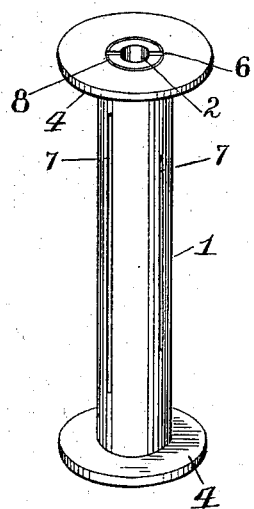
Figure 2:
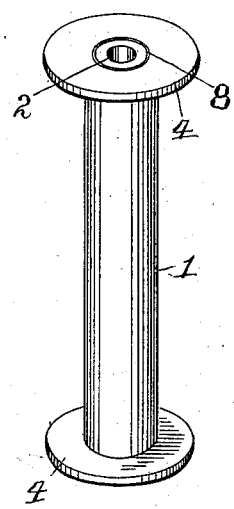
Figure 3:
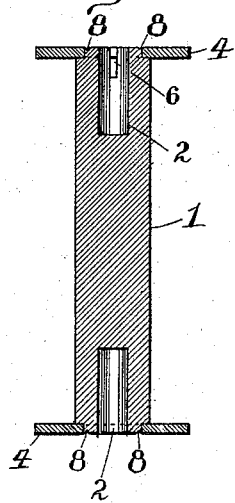
Figure 4:
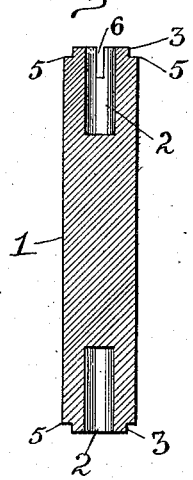

In the drawings, Figure 1 is a perspective view of a spool constructed in accordance with my invention; Fig. 2, a similar view showing the opposite end; Fig. 3, a longitudinal sectional view; Fig. 4, a sectional view of a spindle forming part of the spool.

Similar reference-numerals indicate similar parts.

The film-cartridges, of which my spools form the support, are composed of a strip of black paper and sensitive photographic film wound together upon the spool in such manner that the film is protected from light and the cartridges may be introduced in the cameras adapted for them in daylight without exposing the film to light, and as the primary object of the cartridge is to obviate the necessity of carrying heavy glass photographic plates and plate-holders it is desirable that the cartridges be as light as possible, and as the spools are thrown away after the film is wound off them that they may be made of cheap material by automatic machinery capable of turning them out in great quantities at a nominal cost. The lightest and cheapest materials which are adapted for the spools are wood for the body or spindle and cardboard, pasteboard, or similar material for the end flanges.

The spindle, arbor, or body of my spool (indicated by 1 in the accompanying drawings) is formed from a single round stick of wood, which by automatic machinery is formed with the central apertures or recesses 2 in each end for the reception of the centering devices in the camera, and the exterior portions of the ends are reduced at 3 to form the seats for the end disks 4, said disks abutting against the shoulders 5. One of the ends of the spindle is provided with the transverse slot or keyway 6, extending across one of the end recesses 2, for the reception of the flanges or wings of the winding-key in the camera.

7 indicates a slot in the spindle extending longitudinally thereof and preferably at one side of the axis thereof through which the end of the paper which the spool is to contain is passed to fasten it to the spool.

The spindle, as described, is adapted to be and is readily formed in an automatic lathe, and the end disks 4, constituting the end flanges of the spool, are cut from pasteboard, cardboard, press-board, or similar cheap and light material, having the central aperture fitting the reduced ends 3 of the spindle, and are applied thereon and secured, if desired, by glue or a similar adhesive between the parts. In order to prevent the accidental or intentional removal of the end disks 4 and to supplement the action of the holding-glue, I indent, expand, or spread the ends of the spindle at 8 between the central apertures or recesses 2 and the outer edges, preferably, so as to cause a portion to extend over the inner edges of the disks 4 and hold the latter firmly against the shoulders 5, as shown. This indenting or spreading of the spindle ends is at such a distance from the central centering-apertures 2 as not to alter or change them, for the spool must be accurately centered to cause the film and paper to draw evenly from one spool to the other in the camera, and by reason of the wood employed it may be formed in an automatic machine by two circular hammers or ring-tools striking blows at opposite ends simultaneously, said tools being accurately positioned with regard to the devices which hold the spindle during the operation.

The spools as a whole are very light and by reason of the construction and the materials employed can be turned out by automatic machinery at a very rapid rate and a nominal cost.

I claim as my invention—

As an article of manufacture, a spool for photographic-film cartridges, composed of a wooden spindle having the ends reduced exteriorly forming shoulders thereon and the centering-recesses in the ends of the spindle, the key-slot at one end of the latter extending across the recess therein, and the perforated cardboard disks or flanges abutting the shoulders and surrounding the reduced ends of the spindle, the latter being indented slightly at points removed from the centering-recesses to spread the fibers of the wood to secure the flanges without changing the shape of or affecting said centering-recesses.

FRANK A. BROWNELL.

Witnesses:
F. F. CHURCH,
G. A. RODA.